United States Patent
Ruthinowski

(10) Patent No.: US 10,543,806 B2
(45) Date of Patent: Jan. 28, 2020

(54) SEATBELT ASSEMBLY

(71) Applicant: FORD GLOBAL TECHNOLOGIES, LLC, Dearborn, MI (US)

(72) Inventor: Richard Edward Ruthinowski, Taylor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 110 days.

(21) Appl. No.: 15/906,088

(22) Filed: Feb. 27, 2018

(65) Prior Publication Data

US 2019/0263349 A1     Aug. 29, 2019

(51) Int. Cl.
| | |
|---|---|
| *B60R 22/185* | (2006.01) |
| *B60R 22/28* | (2006.01) |
| *A44B 11/25* | (2006.01) |
| *B60R 22/18* | (2006.01) |

(52) U.S. Cl.
CPC ...... *B60R 22/1855* (2013.01); *A44B 11/2557* (2013.01); *A44B 11/2561* (2013.01); *B60R 22/28* (2013.01); *B60R 2022/1806* (2013.01); *B60R 2022/1812* (2013.01); *B60R 2022/281* (2013.01); *B60R 2022/286* (2013.01)

(58) Field of Classification Search
CPC . B60R 22/185; B60R 22/1855; B60R 22/195; B60R 22/28; B60R 2022/1806; B60R 2022/1812; B60R 2022/281; B60R 2022/285; B60R 2022/286; B60R 22/18; A44B 11/2538; A44B 11/2557; A44B 11/2561
See application file for complete search history.

(56) References Cited

U.S. PATENT DOCUMENTS

| | | | | |
|---|---|---|---|---|
| 3,390,436 | A * | 7/1968 | Prete, Jr. ............ | A44B 11/2557 24/196 |
| 3,888,541 | A * | 6/1975 | Stephenson ........ | A44B 11/2557 297/479 |
| 3,898,715 | A * | 8/1975 | Balder ............... | A44B 11/2557 24/196 |
| 4,127,922 | A * | 12/1978 | Mita ................... | A44B 11/2511 24/637 |
| 4,291,918 | A * | 9/1981 | Finn .................. | A44B 11/2557 24/193 |
| 4,551,889 | A * | 11/1985 | Narayan ............. | A44B 11/10 24/171 |
| 4,848,794 | A * | 7/1989 | Mader ............... | A44B 11/2557 280/801.1 |

(Continued)

FOREIGN PATENT DOCUMENTS

| | | | |
|---|---|---|---|
| JP | 2001010444 A | * | 1/2001 |
| JP | 2002211354 A | | 7/2002 |

(Continued)

*Primary Examiner* — Laura Freedman
(74) *Attorney, Agent, or Firm* — Frank A. MacKenzie; MacMilan, Sobanski & Todd, LLC

(57) ABSTRACT

A seatbelt assembly that includes a tongue assembly having a weblock mounted to a tongue selectively securable to a buckle; a webbing extends through the weblock between a torso portion and a lap portion; and with the weblock allowing for the webbing to slide between the torso and lap portions when in an unlocked position and pivoting relative to the tongue when in a locked position to reorient the torso portion extending from the tongue.

10 Claims, 6 Drawing Sheets

(56) References Cited

U.S. PATENT DOCUMENTS

| | | | | |
|---|---|---|---|---|
| 4,871,190 A | * | 10/1989 | Willey | B60R 22/30 280/801.1 |
| 4,878,272 A | * | 11/1989 | Kotikovsky | A44B 11/2557 24/196 |
| 4,893,874 A | * | 1/1990 | Childress | A44B 11/10 24/196 |
| 4,935,994 A | * | 6/1990 | Boone | A44B 11/2557 24/171 |
| 4,962,572 A | * | 10/1990 | Prentkowski | A44B 11/2557 24/196 |
| 4,979,764 A | * | 12/1990 | Drinane | A44B 11/2557 24/171 |
| 5,058,244 A | * | 10/1991 | Fernandez | A44B 11/12 24/136 K |
| 5,100,176 A | * | 3/1992 | Ball | A44B 11/2557 24/171 |
| 5,138,749 A | * | 8/1992 | McCune | A44B 11/2557 24/170 |
| 5,295,713 A | * | 3/1994 | McCune | A44B 11/2557 280/801.1 |
| 5,383,713 A | * | 1/1995 | Kamiyama | B60R 21/18 280/733 |
| 5,507,552 A | | 4/1996 | Ineich et al. | |
| 5,548,874 A | * | 8/1996 | Mishina | A44B 11/2557 24/170 |
| 5,806,148 A | * | 9/1998 | McFalls | A44B 11/2561 24/168 |
| 5,870,816 A | * | 2/1999 | McFalls | A44B 11/2553 24/170 |
| 6,708,380 B2 | * | 3/2004 | Schneider | A44B 11/12 24/629 |
| 7,185,919 B2 | * | 3/2007 | Mather | B60R 22/30 24/170 |
| 7,325,280 B2 | | 2/2008 | Ichida | |
| 7,712,194 B2 | * | 5/2010 | Fyhr | A44B 11/2553 24/171 |
| 7,871,132 B2 | * | 1/2011 | Rogers | A44B 11/2561 24/171 |
| 7,996,964 B2 | * | 8/2011 | Wendt | B60R 22/28 24/593.1 |
| 8,052,220 B2 | * | 11/2011 | Dennis | B60R 22/18 297/480 |
| 8,172,267 B2 | | 5/2012 | Eberle et al. | |
| 8,322,000 B2 | * | 12/2012 | Dziengowski | A44B 11/2561 24/171 |
| 8,793,844 B2 | * | 8/2014 | McFalls | A44B 11/2553 24/170 |
| 8,813,316 B2 | * | 8/2014 | Richter | B60R 22/18 24/168 |
| 8,820,788 B2 | * | 9/2014 | Goudeau | A44B 11/2561 280/806 |
| 8,840,145 B2 | * | 9/2014 | Bougher | A44B 11/2561 24/171 |
| 9,615,632 B2 | * | 4/2017 | Okano | A44B 11/2561 |
| 9,988,013 B2 | * | 6/2018 | Cahill | B60R 22/28 |
| 10,182,622 B2 | * | 1/2019 | Knoedl | A44B 11/2557 |
| 10,434,976 B2 | * | 10/2019 | Ruthinowski | B60R 22/1855 |
| 2006/0214494 A1 | | 9/2006 | Katayama | |
| 2006/0226694 A1 | | 10/2006 | Higuchi et al. | |
| 2012/0286501 A1 | | 11/2012 | Goudeau et al. | |
| 2017/0297528 A1 | * | 10/2017 | Hermann | B60R 22/1855 |
| 2019/0135224 A1 | * | 5/2019 | Krambeck | B60R 22/1855 |
| 2019/0208869 A1 | * | 7/2019 | Lee | B60R 22/18 |
| 2019/0263350 A1 | * | 8/2019 | Ruthinowski | B60R 22/28 |
| 2019/0263351 A1 | * | 8/2019 | Ruthinowski | B60R 22/1855 |

FOREIGN PATENT DOCUMENTS

| | | | |
|---|---|---|---|
| JP | 4917510 B2 | | 2/2012 |
| JP | 2012250558 A | | 12/2012 |
| JP | 2013018460 A | | 1/2013 |
| JP | 2018058559 A | * | 4/2018 |
| KR | 20110045716 | | 5/2011 |

* cited by examiner

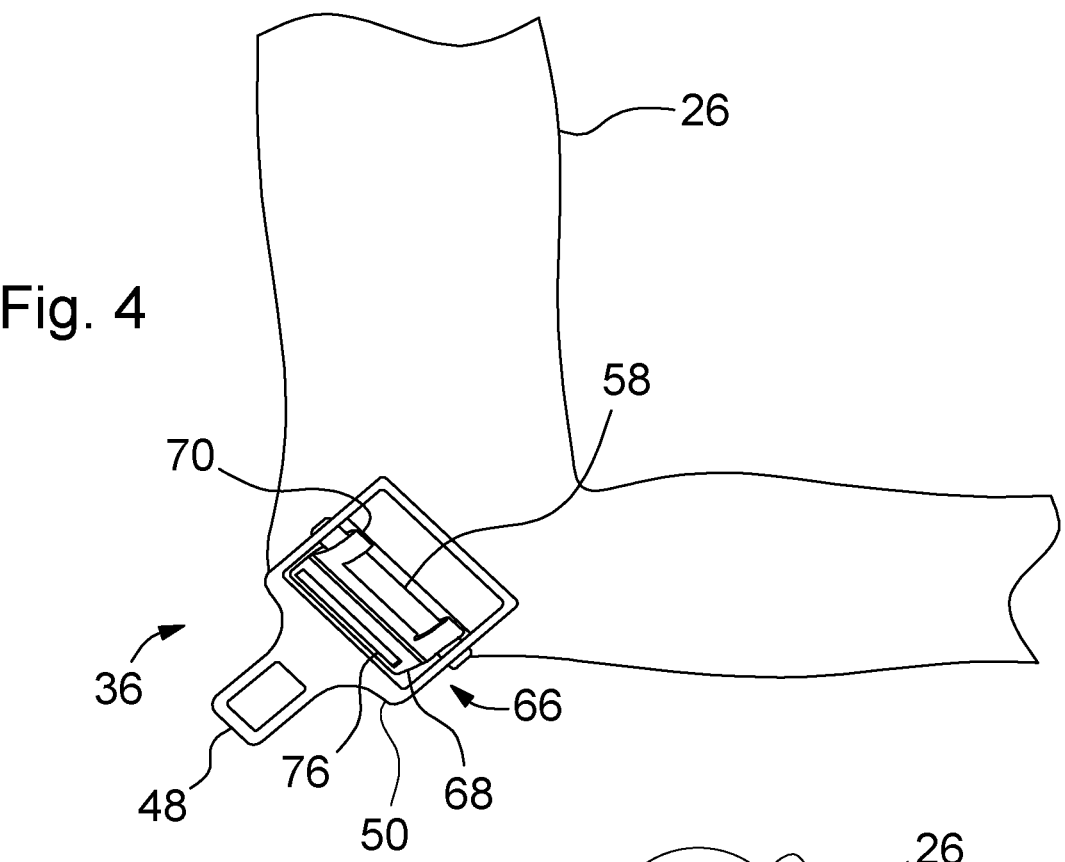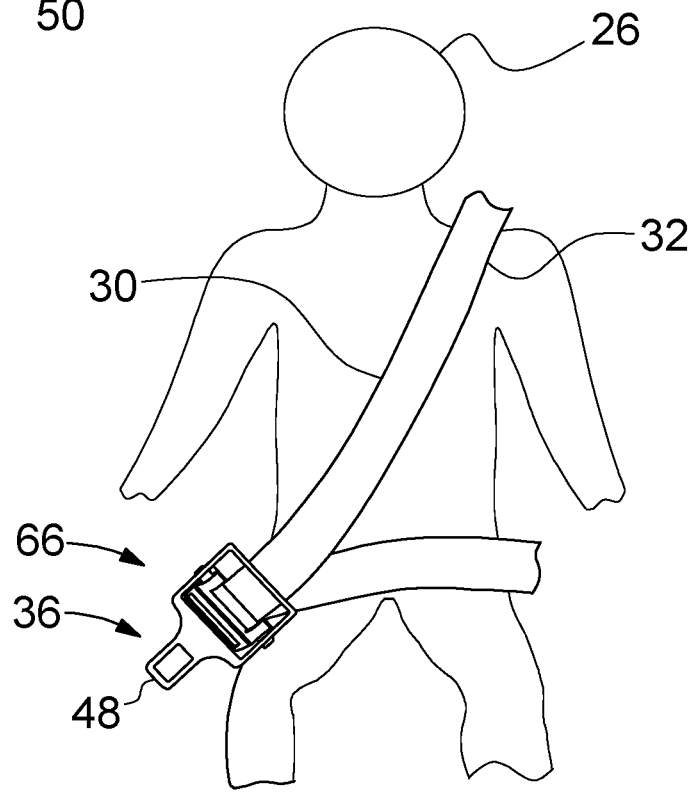

US 10,543,806 B2

SEATBELT ASSEMBLY

BACKGROUND OF INVENTION

This invention relates to a seatbelt assembly employed in a vehicle, and in particular to a tongue assembly portion of a seatbelt assembly.

Seat belts in vehicles are used to restrain the occupants during vehicle impact events. Typically, the seat belt is arranged with a combination of a lap and shoulder belt, with the webbing extending through a tongue assembly for adjusting the amount of webbing between the portion extending across the lap and the portion extending across the torso of the vehicle occupant. While the webbing is adjustable between the lap and torso portions as one is putting-on the seat belt, during an impact event, the tongue assembly is generally configured to hold (i.e., lock) the webbing relative to each portion in order to fully support the vehicle occupant's lap and torso. Accordingly, it is desirable for the seat belt to provide good support for both the occupant's lap and the occupant's torso, and for the tongue to operate in such a way so as to assist in providing good support for both the lap and torso portions of the seat belt.

SUMMARY OF INVENTION

An embodiment contemplates a seatbelt assembly comprising a tongue assembly having a weblock mounted to a tongue selectively securable to a buckle; a webbing extending through the weblock between a torso portion and a lap portion; and the weblock allowing for the webbing to slide between the torso and lap portions when in an unlocked position and pivoting relative to the tongue when in a locked position to reorient the torso portion extending from the tongue.

An embodiment contemplates a method of operating a seatbelt comprising: slidably securing webbing between a lap portion and a torso portion through a weblock of a tongue assembly when in an unlocked position; and upon forces exerted by an occupant on the webbing, the weblock locking the webbing from movement between the lap and torso portions while pivoting relative to the tongue to reorient the torso portion extending from the tongue.

An advantage is in maintaining seatbelt assembly comfort, ease of use and safety capabilities for vehicle occupants, while enhancing functionality of the seatbelt assembly. During a vehicle event where an occupant wearing the seatbelt pushes forward into the webbing, a weblock of the tongue assembly locks the belt between torso portions and lap portions while allowing for a small amount of payout in the torso portion in order to potentially reduce chest deflection under such a loading condition, while also allowing for a repositioning of the webbing for improved load path across the vehicle occupant. The seatbelt tongue assembly also allows for convenient storage below, for example, a D-ring attached to vehicle structure, such as a vertical pillar.

BRIEF DESCRIPTION OF DRAWINGS

FIG. 4 is a schematic, side view of a portion of the tongue assembly as it would be located relative to a vehicle occupant when the seatbelt is in a position that secures the occupant in place but not under loading from the occupant.

FIG. 5 is a schematic, front view of seatbelt webbing and a portion of the tongue assembly as it would be located relative to a vehicle occupant when the seatbelt is in a position that secures the occupant in place but not under loading from the occupant.

DETAILED DESCRIPTION

Figure 1:
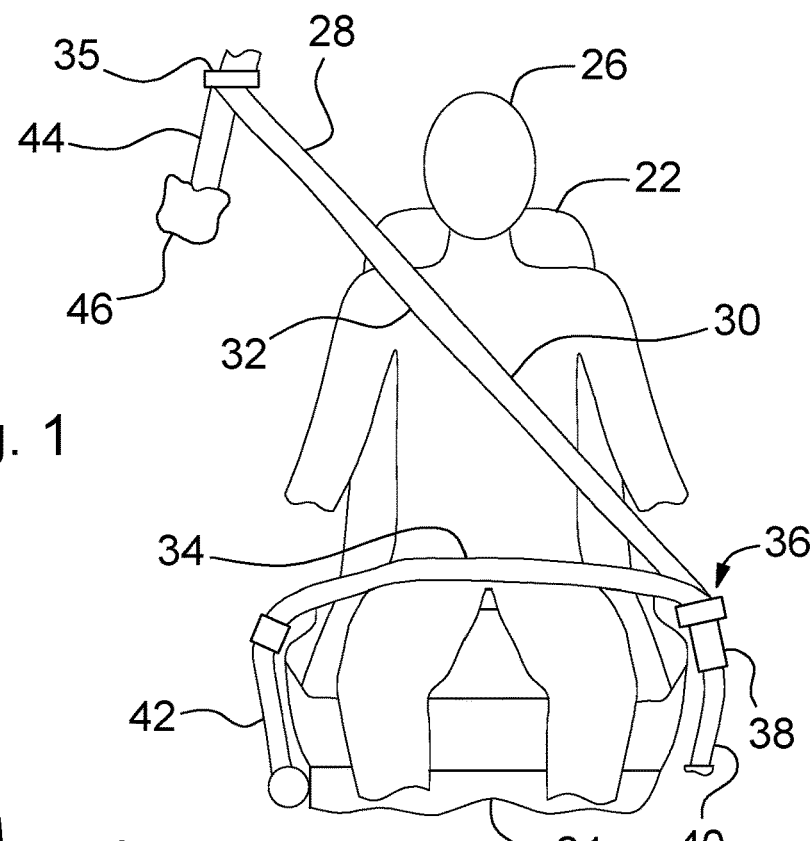
FIG. 1 is a schematic of a vehicle occupant seated in a vehicle seat, with a seat belt securing the occupant in place.
Figure 2:
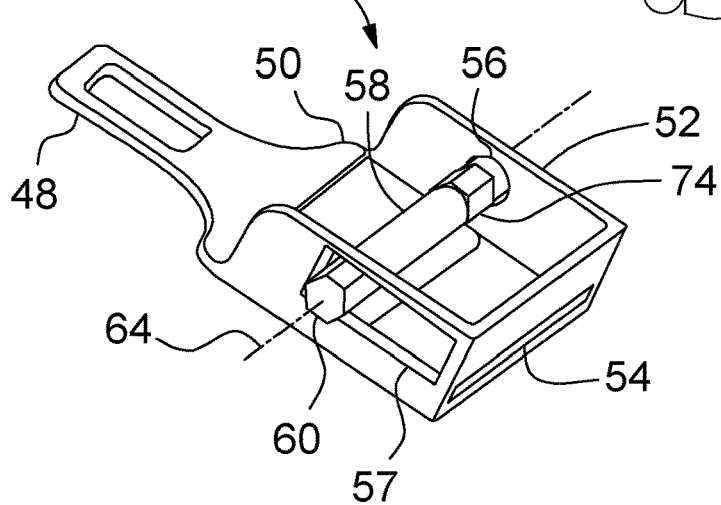
FIG. 2 is a schematic, perspective view of a portion of a tongue assembly.
Figure 3:
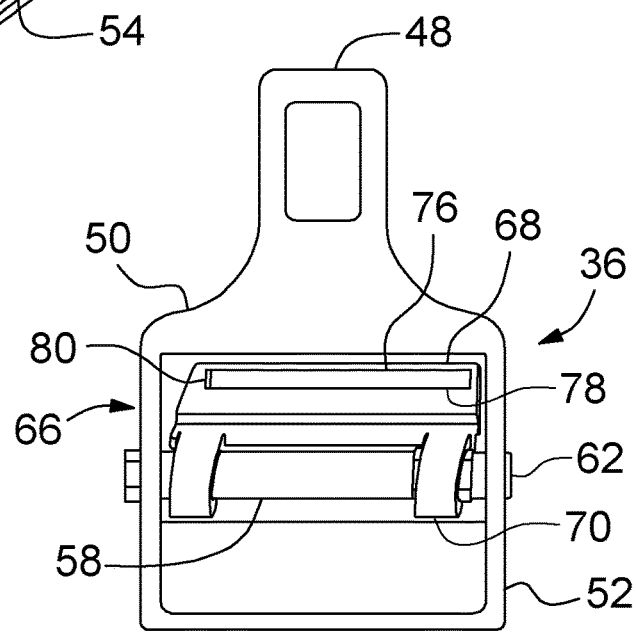
FIG. 3 is a schematic, side view of a portion of the tongue assembly.

FIG. 1 shows a portion of a vehicle, having a vehicle seat 22 mounted to vehicle structure 24. An occupant 26 is shown sitting in the seat 22 and secured therein by a seatbelt 28, shown in the buckled condition.

The seat belt 28 includes webbing 30, which includes a torso portion 32 extending across the occupant's torso and a lap portion 34 extending across the occupant's hips. The webbing 30 extends through a tongue assembly 36 and is selectively slidable through this tongue assembly 36 between the lap portion 34 and the torso portion 32. The tongue assembly 36 is selectively secured to and released from a buckle (clasp) 38, which is secured, via a support 40, to the seat 22 or vehicle structure 24. The buckle 38 may be conventional and so will not be shown in more detail herein. An end 42 of the lap portion 34 of the webbing 30 is secured to the vehicle structure 24 or seat 22. Thus, when the tongue assembly 36 is locked to prevent webbing 30 from sliding through it, the lap portion 34 secures the occupant's hips in the seat 22.

The torso portion 32 of the webbing 30 has an end 44 that extends through, for example, a D-ring 35 into a retractor mechanism 46 (not shown in any detail herein as this may be conventional) attached to the vehicle structure 24 (such as a vertical pillar of the vehicle). The retractor mechanism 46 may have inertial or other types of locks that selectively allow for web feeding into the torso portion 32 of the webbing 30 to allow for the occupant 26 to put on the seat belt but prevent (or extensively limit) web feeding out during certain vehicle deceleration events. This type of operation of the retractor mechanism 46 may be conventional and so will not be discussed in further detail herein.

Figure 7:
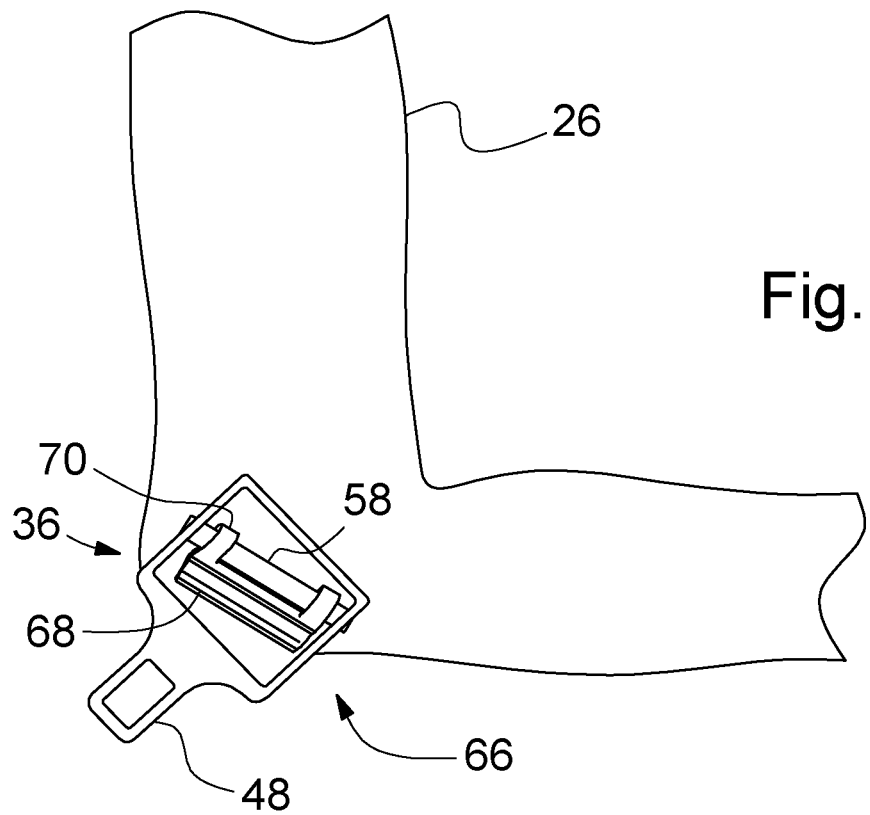
FIG. 7 is a schematic, side view of a portion of the tongue assembly as it would be located relative to a vehicle occupant when the seatbelt is in a position that secures the occupant in place under loading from the occupant.
Figure 8:
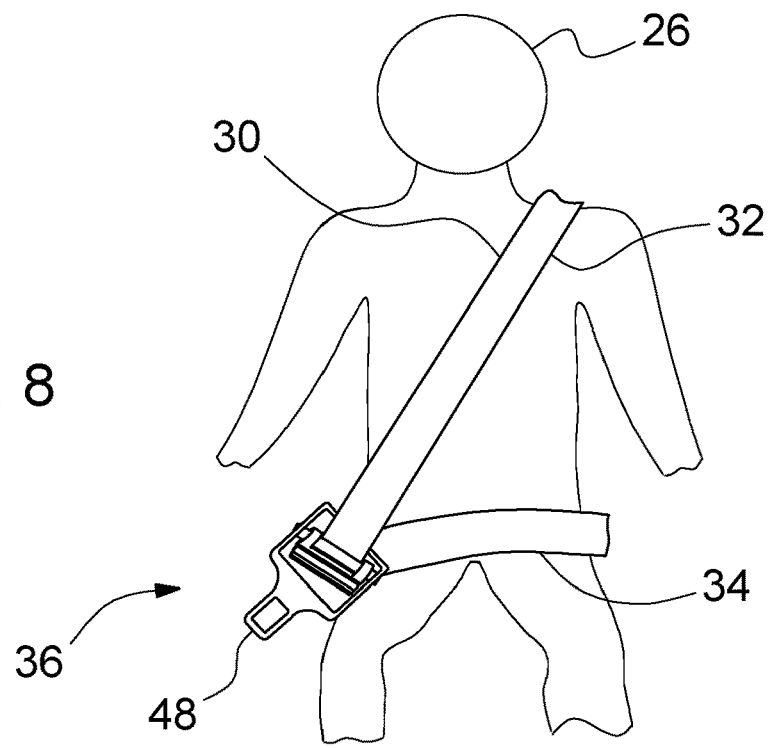
FIG. 8 is a schematic, front view of the seatbelt webbing and a portion of the tongue assembly as it would be located relative to a vehicle occupant when the seatbelt is in a position that secure the occupant in place while under loading from the occupant.
Figure 9:
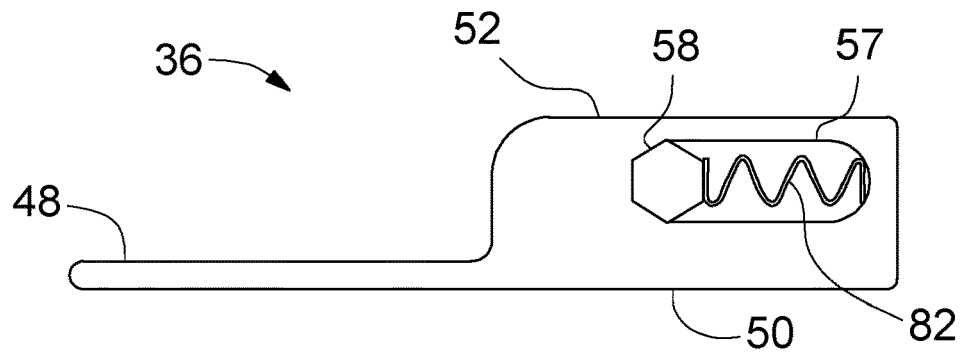
FIG. 9 is a schematic, side view of a portion of the tongue assembly.
Figure 10:
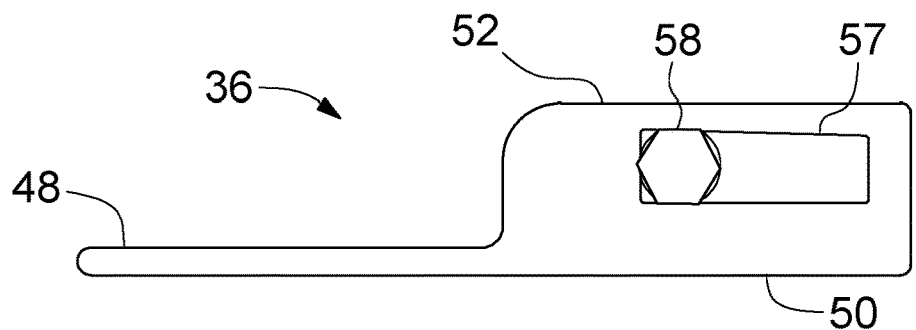
FIG. 10 is a schematic, side view of a portion of the tongue assembly.
Figure 11:
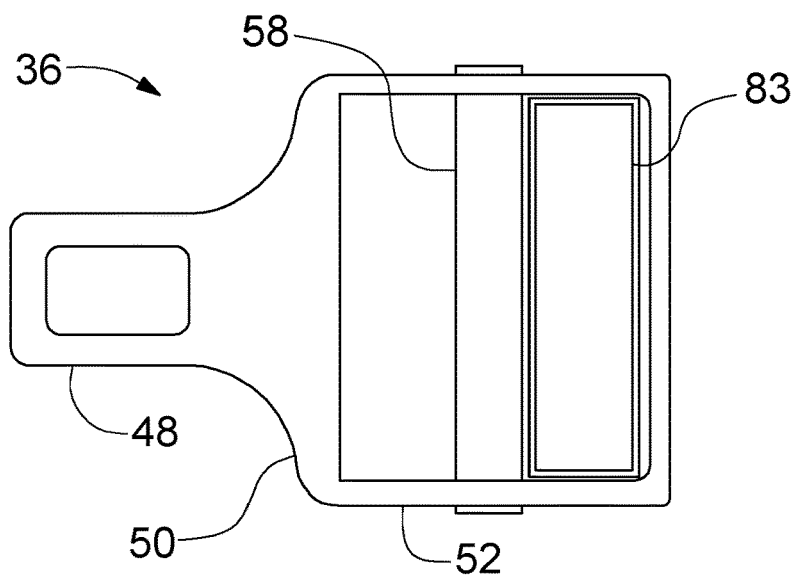
FIG. 11 is a schematic, side view of a portion of the tongue assembly.
Figure 12:
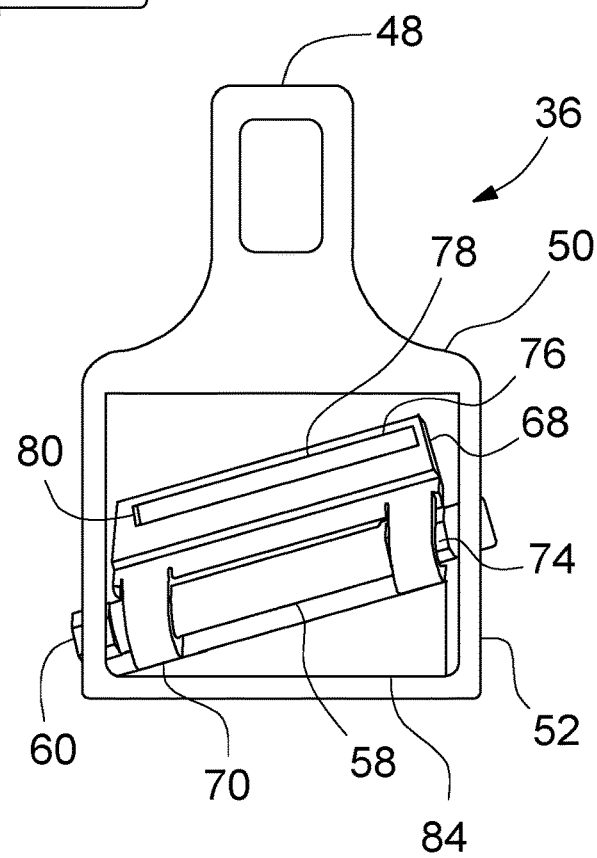
FIG. 12 is a schematic, side view of a portion of the tongue assembly.

FIGS. 2-12 and 14-16 (discussed with reference to FIG. 1) show various portions of the tongue assembly 36, along with FIGS. 5 and 8 illustrating the torso portion 32 of the webbing 30 extending across a torso of the occupant 26. The tongue 48 may be a portion of or attached to a tongue plate 50 and can be selectively locked into and released from the buckle 38, which may be conventional and so will not be discussed further herein. Tongue walls 52 extend from and generally normal to the tongue plate 50. The tongue walls 52 may include a webbing guide slot 54, through which the webbing 30 slides, a first tongue aperture 56, which may be generally circular or may be keyed such as in a hex shape, if so desired, and a second tongue aperture 57, which is an elongated aperture forming a slot. The first tongue aperture 56 may also have a truncated conical shape to allow for pivoting of a bar 58 within this aperture 56.

The bar 58 extends into each tongue aperture 56, 57 and may have a keyed (hexagonal) end 60 that his secured against rotation in one of the tongue apertures 56, 57 and an opposed end 62 that is secured in the other tongue aperture 56, 57. The bar 58 is sized to allow for the end received in the slotted aperture 57 to slide along the length of the slot while the bar 58 is allowed to pivot a small amount within the first tongue aperture 56. The slotted aperture 57 may be shaped as a general oval (shown in FIG. 9) or may be a tapered slot (shown in FIG. 10). The longitudinal dimension of the bar 58 may define an axis 64 about which a weblock 66 pivots.

A compression spring 82 (shown in FIG. 9) may bias the bar 58 toward the tongue end of the slotted aperture 57 (the position shown in FIG. 9, called the "front" end herein); the taper in the slotted aperture 57 (shown in FIG. 10) may bias the bar 58 toward the front end of the slot 57; a rectangular compressible elastomeric block 83 (shown in FIG. 11) may bias the bar 58 toward the front end of the slot 57; and/or a triangular compressible elastomeric block 84 (shown in FIG. 12) may bias the bar 58 toward the front end of the slot 57. In each case, the particular element provides a biasing force from an elastomeric member in order to bias the bar 58 toward the front of the slot 57. This orientation may be considered a non-use or stowage orientation of the bar 58. Such bias is overcome when occupant loading is applied to the webbing 30.

The weblock 66 includes a housing 68, which includes bar supports 70 having channels 72 through which the bar 58 extends. The channels 72 may be keyed to match a corresponding keyed (e.g. hexagonal) midsection 74 of the bar 58, which would limit rotation of the bar 58 relative to the bar supports 70. The housing 68 also includes a webbing slot 76 through which the webbing 30 is guided. The weblock 66 also includes a lock 78 having a lock feature 80, which in effect locks the webbing 30 to the housing 68 in order to prevent feeding of the webbing 30 between the lap portion 34 and the torso portion 32 when the lock feature 80 is in a locked position. The lock 78 may be formed via the webbing slot 76. Thus, the lock feature 80 may be, for example, the slot 76 extending axially across the housing 68, through which the webbing 30 extends. With the weblock 68 in an unlocked position (shown in FIGS. 14-16), the webbing 30 can relatively freely slide back-and-forth between the torso portion 32 and the lap portion 34.

The operation of the tongue assembly 36 with weblock 66 will now be discussed relative to FIGS. 1-10 and 14-16. Under typical vehicle operating conditions when the seatbelt 28 is in the buckled position (shown in FIG. 1), there are minimal forces acting on the tongue assembly 36, in which case the lock 78 in the housing 68 is angled so that the lock feature 80 does not engage the webbing 30. This condition can be seen in FIG. 5. Since the lock feature 80 does not engage the webbing 30 in this condition, the webbing is relatively free to slide between the torso portion 32 and the lap portion 34, allowing for comfort of the occupant 26. Also, in this condition where there are minimal forces acting on the tongue assembly 36, the bar 58 may be located in the front end of the slotted aperture 57 (as shown in FIGS. 2-5, 9, 10 and 14-16)—although, the spring biasing effect may be low enough that the bar 58 is only in this orientation when the seatbelt is not buckled (the non-use/stowage position). Being in this position, the torso portion 32 of the webbing 30 provides a predetermined orientation of the torso portion 32 as it extends from the tongue assembly 36 toward the occupant 26.

Figure 6:
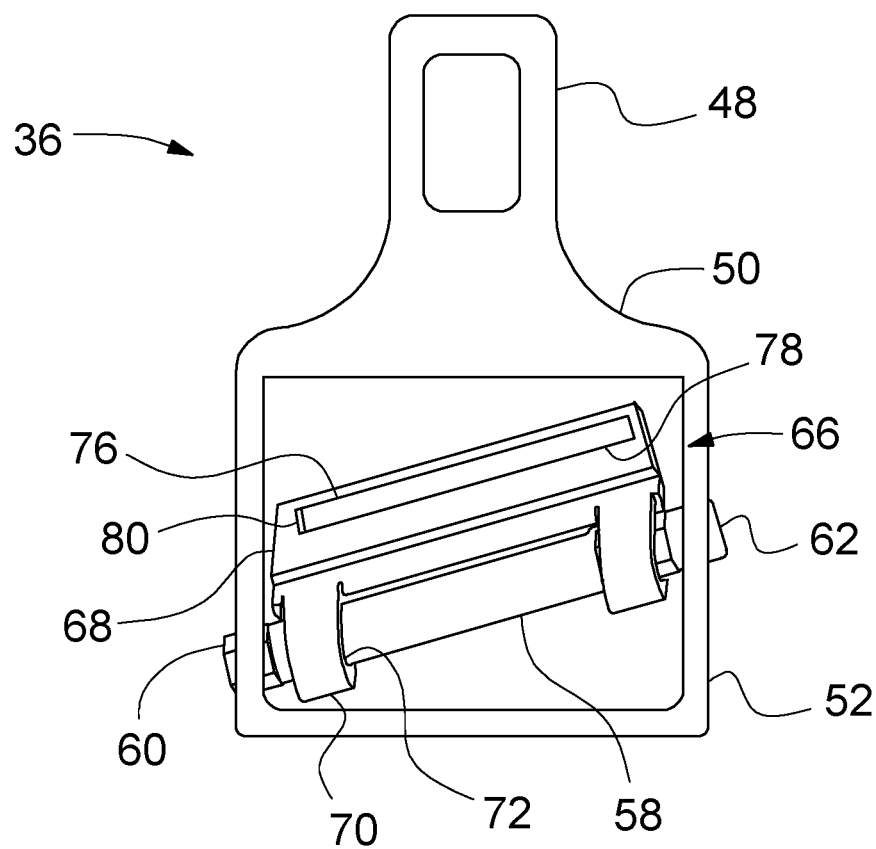
FIG. 6 is a schematic, side view of a portion of the tongue assembly in a position that secures the occupant in place while under loading from the occupant.

In a vehicle operating condition where the vehicle occupant 26 begins to be pushed forward into the webbing 30, the forces from the torso and lap of the occupant 26 act on the torso 32 and lap 34 portions, respectively, causing the bar 58 to slide rearward in the slotted aperture 57 against the bias of the spring 82 (and/or restriction of the taper in the slotted aperture 57 and/or the crushing of the elastomeric block 83/84) and the housing 68 to pivot about the axis 64 of the bar 58 (shown in FIGS. 6-8). The pivoting of the bar 58 and housing 68 reorients the angle/position from which the torso portion 32 extends out of the tongue assembly 36. This reorientation changes the orientation of the torso portion 32 and hence the load path across the torso of the occupant 26, which may improve the loading on the occupant's torso under conditions where the occupant 26 is pushed into the webbing 30. Alternatively, such a reorientation of the bar 58 may occur upon buckling of the seatbelt 28, in which case the reorientation takes place while only a small amount of occupant force is exerted against the seatbelt 28.

The vehicle operating condition, where the vehicle occupant 26 is pushed forward into the webbing 30, also causes the forces from the torso and lap of the occupant 26 act on the torso 32 and lap 34 portions, respectively, causing the housing 68 to pivot about the axis 64 of the bar 58. This movement causes the lock feature 80 to press into the webbing 30, preventing the webbing 30 from sliding through the tongue assembly 36. That is, the weblock 66 locks the webbing 30 in the tongue assembly 36, to fix which part of the webbing 30 is in the torso portion 32 and which part is in the lap portion 34.

Since the motion between the position of FIGS. 5 and 8 causes the belt webbing 30 to be locked, the lap portion 34 maintains its position, essentially without any payout, restraining movement of the occupant 26. The lap portion 34 having "essentially" no payout may possibly include a very small amount of additional tension/tightening of the lap portion 34, but this is likely quite minimal and so the effect is essentially the same as no payout in the lap portion 34 when the belt webbing is locked. In addition, since the housing 68 pivots about the axis 64 of the bar 58 between these unlocked and locked positions, this creates, in effect, a small amount of additional payout of the torso portion 32 of the webbing 30, while overall restraining movement of the occupant 26. As used herein, including in the claims, the term payout means providing webbing 30 in a way that provides additional slack in the lap portion 34 or the torso portion 32—this slack in the webbing (from payout) not coming from the ends of the webbing 30 but from the mechanical functioning of the tongue assembly 36.

Thus, this weblock 66 in the tongue assembly 36 allows for securing the occupant's hips while allowing for a small amount of payout of the torso portion 32 to allow for additional displacement of the occupant's torso, in a controlled manner, during a vehicle operating condition where the occupant is pushed into the seatbelt webbing 30. This may allow for reduced chest load and deflection of the occupant 26 during such vehicle events. The amount of payout may be controlled by the dimensions and stiffness of the various components of the tongue assembly 36, such as for example the length, diameter and/or material stiffness of the bar 58, as well as the sizing and/or material stiffness of the various portions of the housing 68.

As part of the weblock 66 allowing for the small amount of controlled torso portion 32 payout while locking the lap portion 34 to essentially prevent payout, some elements may have a flexing capability. This flexing capability may take the form of twisting, crushing (compressing), bending, rotating or other form of deformation. Thus, when using the term "flexing" herein, including in the claims, this may include such forms of deformation as just discussed above. This flexing is on a macro-scale, allowing for noticeable torso portion 32 payout, rather than a micro-scale (as every material subjected to a force has some deformation, at least on a microscopic scale).

For example, the housing 68 may be formed from an elastomeric material that allows for bending when a tension load is applied to the torso portion 32. With such an arrangement, if the bar 58 has the keyed end 60 in a keyed tongue aperture 56 and/or 57 to prevent that end of the bar 58 from rotating relative to the tongue plate 50, and at least one of the channels 72 in the bar supports 70 are keyed to align with the keyed portion of the bar 58, then the bar supports 70 may have minimal rotation relative to the bar 58 under torso portion loading. In such a case, the housing 68, under a loading of the torso portion 32, flexes adjacent to the bar supports 70, providing for the small payout of the torso portion 32 when the weblock 66 is locked.

In another example, the bar 58 may be formed from an elastomeric material that allows for twisting of the bar 58 when the torso portion 32 is loaded while the weblock 66 is locked. With such an arrangement, the bar 58 has the keyed portion in a keyed tongue aperture 56 and/or 57 to prevent that end of the bar 58 from rotating relative to the tongue plate 50, and at least one of the channels 72 in the bar supports 70 are keyed to align with the keyed portion of the bar 58, then the bar supports 70 may have minimal rotation relative to the bar 58 under torso portion loading. In such a case, the bar 58, under a loading of the torso portion 32 flexes by twisting about the axis 64, allowing for a rotation of the housing 68, which in turn, provides for a small payout of the torso portion 32 when the weblock 66 is locked.

The present embodiment of FIGS. 2-10 and 14-16 preferably has both an elastomeric housing 68 and elastomeric bar 58, in which case, both elements provide some flexing, which results in the small amount of payout of the torso portion 32. The amount of force/torsion needed to cause the bending in the housing 68 and the twisting in the bar 58 can be set at different levels of force/torque imparted to the webbing 30. In such a case, the flexing may occur sequentially rather than simultaneously with the housing 68 and bar 58. Although, if one does not wish to have the flexing of both the housing 68 and bar 58, then one may configure one or the other to be stiff while only the other is flexible under seatbelt loading conditions. The dimensional geometry of the components may be set for the particular application in order to achieve the desired amount of torso portion payout.

Also, since the bar 58 has been reoriented relative to the tongue 48 (by sliding in the slotted aperture 57, which changes the orientation of the axis 64), the deformation of the components that allow for the small payout of the torso portion 32 may be enhanced. That is, the orientation of the deformable elements may be better oriented relative to the reaction force exerted by the webbing 30 at the location of the D-ring 35, as well as the path of the torso portion 32 being better aligned with a preferred path to the D-ring 35 across the torso of the occupant 26.

Figure 13:
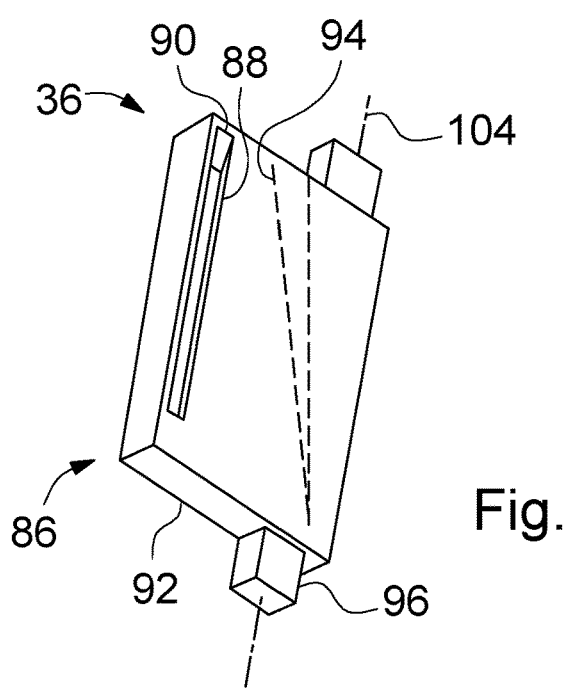
FIG. 13 is a schematic, side view of a portion of the tongue assembly, with a variation in the housing of the tongue assembly.
Figure 14:
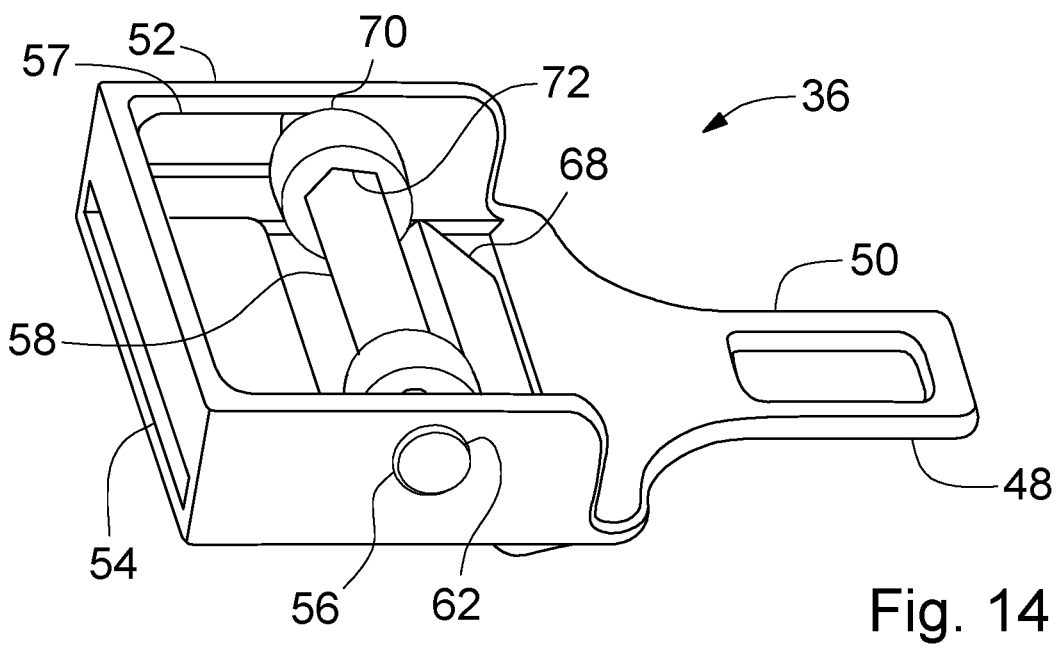
FIG. 14 is a schematic, perspective view of a portion of the tongue assembly.
Figure 15:
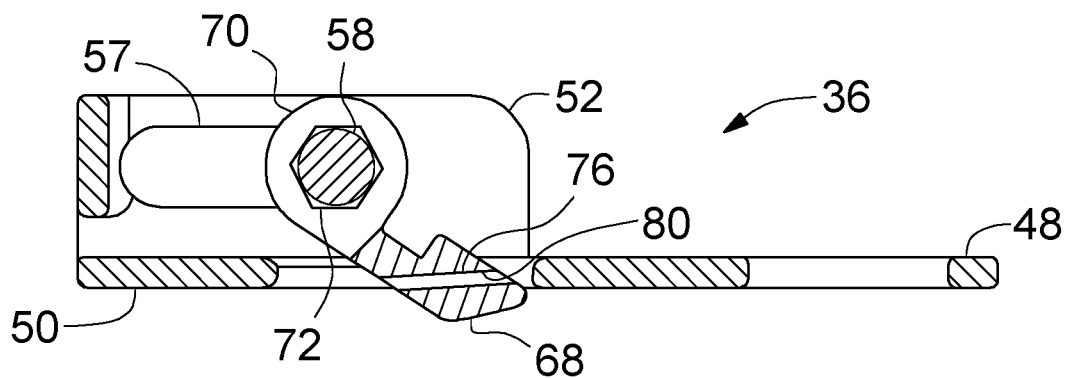
FIG. 15 is a schematic, partially cross-section view of a portion of the tongue assembly.
Figure 16:
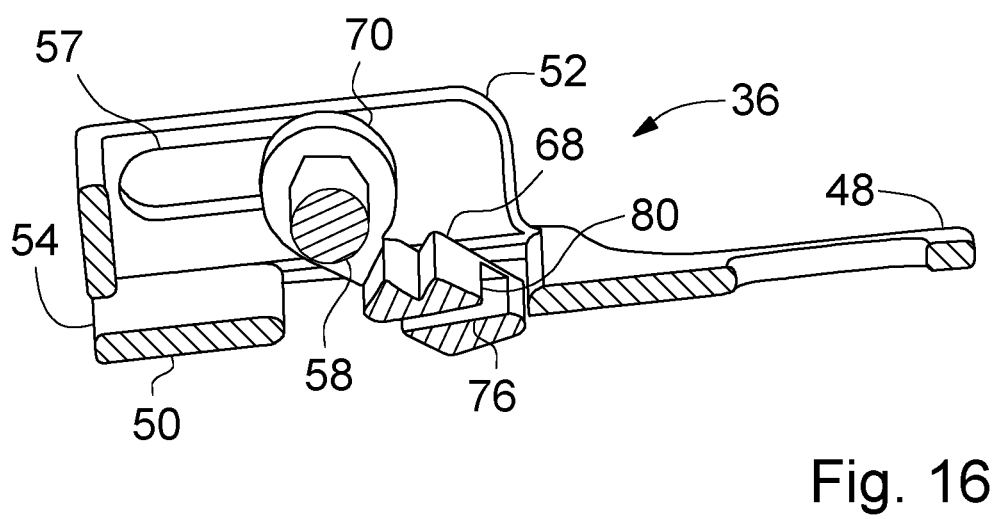
FIG. 16 is a schematic, perspective, partially cross-section view of a portion of the tongue assembly.

FIG. 13 (discussed with reference to FIG. 1) illustrates the tongue assembly 36, with an alternative weblock 86. In this embodiment, the weblock 86 comprises a housing 92 that is a flat (in its unloaded position) plate, with flexing notches 94 recessed into a surface opposite from the surface that makes contact with the webbing 30, and with an integral bar 96 having keyed (may be rectangular shaped or other keyed shape). The tongue walls of the tongue include corresponding keyed (in this instance rectangular shaped) tongue apertures for receiving the bar 96 and preventing rotation of the bar 96 about the axis 104. The number, spacing, depth and width of the flexing notches 94 may be engineered to provide the desired amount of flexing per amount of load applied by the occupant 26 to the webbing 30.

In addition, these flexing notches 94 may be angled relative to the axis 104, which causes the bending to be off-axis. The housing 92, with the angled notches 94, then, acts similarly to one of the tongue apertures being slotted (in FIGS. 2-10) by reorienting the torso portion 32 of the webbing 30 under vehicle conditions where the occupant 26 is pushing forward into the webbing 30. This reorientation changes the orientation of the torso portion 32 and hence the load path across the torso of the occupant 26, which may improve the loading on the occupant's torso under conditions where the occupant 26 is pushed into the webbing 30.

The lock feature 88 of the lock 90 is integral to the housing 92. The lock feature 88 is a slot extending axially across the housing 92, through which the webbing 30 extends. With the weblock 86 in an unlocked position, the webbing 30 can relatively freely slide back-and-forth between the torso portion 32 and the lap portion 34.

In a vehicle operating condition where the vehicle occupant 26 is pushed forward into the webbing 30, the forces from the torso and lap of the occupant 26 act on the torso 32 and lap 34 portions, respectively, causing the housing 92 to flex about the flexing notches 94. This movement causes the lock feature 88 to press into the webbing 30, preventing the webbing 30 from sliding through the tongue assembly 36. That is, the weblock 86 locks the webbing 30 in the tongue assembly 36, in order to fix which part of the webbing 30 is in the torso portion 32 and which part is in the lap portion 34. Again, this weblock 86 allows for a small amount of payout of the torso portion 32 while essentially preventing payout of the lap portion 34 as the weblock moves into the locked position.

While certain embodiments of the present invention have been described in detail, those familiar with the art to which this invention relates will recognize various alternative designs and embodiments for practicing the invention as defined by the following claims.

The invention claimed is:
1. A seatbelt assembly comprising:
a tongue assembly having a weblock mounted to a tongue, the tongue selectively securable to a buckle;
a webbing extending through the weblock between a torso portion and a lap portion; and the weblock allowing for the webbing to slide between the torso and lap portions when in an unlocked position and the weblock pivoting relative to the tongue when in a locked position to reorient the torso portion extending from the tongue; and wherein the weblock includes a bar having an end mounted in a slotted hole of the tongue, the weblock includes a housing, mounted to and pivotable with the bar, having a webbing slot through which the webbing extends, and the housing is elastomeric and flexes by bending in the locked position.

2. The seatbelt assembly of claim 1 wherein the bar is elastomeric and flexes in the locked position.

3. The seatbelt assembly of claim 1 including a spring biasing the bar end toward one end of the slotted hole.

4. The seatbelt assembly of claim 3 wherein the spring is a triangular-shaped compressible block.

5. The seatbelt assembly of claim 1 wherein the end of the bar is non-circular, preventing rotation of the bar in the slotted hole.

6. A method of operating a seatbelt comprising:

slidably securing webbing between a lap portion and a torso portion through a weblock of a tongue assembly when in an unlocked position; and upon forces exerted by an occupant on the webbing, the weblock locking the webbing from movement between the lap and torso portions while pivoting relative to a tongue of the tongue assembly to reorient the torso portion extending from the tongue; and wherein the weblock includes a bar having an end mounted in a slotted hole of the tongue, with the end of the bar sliding along the slotted hole to provide the reorientation of the torso portion, and wherein the weblock includes a housing, mounted to and pivotable with the bar, having a webbing slot through which the webbing extends, and elastomerically flexing the housing by bending in a position where the weblock locks the webbing.

7. The method of claim 6 wherein, in a position where the weblock locks the webbing, the weblock flexes to provide payout in the torso portion.

8. The method of claim 6 including biasing the bar end toward one end of the slotted hole with a spring.

9. The method of claim 6 further including elastomerically flexing the bar in a position where the weblock locks the webbing.

10. A seatbelt assembly comprising:

a tongue assembly having a weblock mounted to a tongue, the tongue selectively securable to a buckle;

a webbing extending through the weblock between a torso portion and a lap portion; and the weblock allowing for the webbing to slide between the torso and lap portions when in an unlocked position and the weblock pivoting relative to the tongue when in a locked position to reorient the torso portion extending from the tongue, and wherein the weblock includes an elastomeric plate having recessed flexing notches angled relative to a bar extending from the plate, such that the flexing notches reorient the torso portion extending from the weblock when in the locked position.

* * * * *